US009819696B2

(12) United States Patent
Minea et al.

(10) Patent No.: US 9,819,696 B2
(45) Date of Patent: Nov. 14, 2017

(54) SYSTEMS AND METHODS FOR DETECTING DOMAIN GENERATION ALGORITHM (DGA) MALWARE

(71) Applicant: Bitdefender IPR Management Ltd., Nicosia (CY)

(72) Inventors: Octavian M. Minea, Cluj-Napoca (RO); Cristina Vatamanu, Iasi (RO); Mihai R. Benchea, Iasi (RO); Dragos T. Gavrilut, Iasi (RO)

(73) Assignee: Bitdefender IPR Management Ltd., Nicosia (CY)

( * ) Notice: Subject to any disclaimer, the term of this patent is extended or adjusted under 35 U.S.C. 154(b) by 63 days.

(21) Appl. No.: 14/932,765

(22) Filed: Nov. 4, 2015

(65) Prior Publication Data

US 2017/0126706 A1     May 4, 2017

(51) Int. Cl.
*H04L 29/06* (2006.01)
*G06F 9/455* (2006.01)

(52) U.S. Cl.
CPC ........ *H04L 63/145* (2013.01); *G06F 9/45558* (2013.01); *H04L 63/1408* (2013.01); *H04L 63/1416* (2013.01); *H04L 63/1441* (2013.01); *G06F 2009/45587* (2013.01); *G06F 2009/45595* (2013.01); *H04L 2463/121* (2013.01); *H04L 2463/144* (2013.01)

(58) Field of Classification Search
CPC ............... H04L 63/145; H04L 63/1416; G06F 9/45558; G06F 2009/45587; G06F 2009/45595
USPC .......................................................... 726/23
See application file for complete search history.

(56) References Cited

U.S. PATENT DOCUMENTS

| 5,500,897 | A | 3/1996 | Hartman |
| 8,220,031 | B2 | 7/2012 | Leterrier et al. |
| 8,260,914 | B1 * | 9/2012 | Ranjan ................ H04L 61/1511 709/224 |
| 8,327,448 | B2 | 12/2012 | Eldar et al. |
| 8,763,117 | B2 | 6/2014 | Carothers |

(Continued)

OTHER PUBLICATIONS

European Patent Office, International Search Report and Written Opinion dated Dec. 15, 2016 for PCT International Application No. PCT/EP2016/076343, international filing date Nov. 2, 2016, priority date Nov. 4, 2015.

(Continued)

*Primary Examiner* — Baotran N To
(74) *Attorney, Agent, or Firm* — Law Office of Andrei D Popovici, PC (57) ABSTRACT

Domain generation algorithm (DGA) malware is detected by intercepting an external time request sent by a potential DGA malware host, and replacing the received real time with an accelerated (future) real time designed to trigger time-dependent DGA activity. The interception and replacement are performed outside the physical or virtual DGA host, on a different physical or virtual system such as a distinct external physical server or router, or distinct hypervisor or virtual machine running on the same physical system, in order to reduce the risk that the DGA malware identifies the time substitution. Failed DGA malware external access requests triggered only at future times are then used to identify domain names generated by the DGA malware, allowing proactive countermeasures.

17 Claims, 11 Drawing Sheets

(56) References Cited

U.S. PATENT DOCUMENTS

2012/0084860 A1     4/2012    Cao et al.
2014/0310811 A1    10/2014    Hentunen

OTHER PUBLICATIONS

Kolbitsch et al., "Inspector Gadget: Automated Extraction of Proprietary Gadgets from Malware Binaries," IEEE Symposium on Security and Privacy, Piscataway, NJ, USA, May 2010.
Brumley et al., "Automatically identifying trigger-based behavior in malware," Botnet Detection, Series vol. 36, pp. 65-88, Springer US, Jan. 2008.
Crandall et al., "Temporal search: Detecting hidden malware timebombs with virtual machines," ACM Sigplan Notices, vol. 41. No. 11, pp. 25-36, ACM, New York, NY, USA, Oct. 2006.
Stack Overflow, "Regular expression for matching HH:MM time format," https://stackoverflow.com/questions/7536755/regular-expression-for-matching-hhmm-time-format, Stack Exchange Network, New York, USA, Sep. 2011-Apr. 2015.

\* cited by examiner

SYSTEMS AND METHODS FOR DETECTING DOMAIN GENERATION ALGORITHM (DGA) MALWARE

BACKGROUND

The invention relates to systems and methods for protecting computer systems from malware, and in particular to systems and methods for detecting malware that employs domain generation algorithm(s) (DGA).

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others.

Security software may be used to detect malware infecting a user's computer system, and additionally to remove or stop the execution of such malware. Several malware-detection techniques are known in the art. Some rely on matching a fragment of code of the malware agent to a library of malware-indicative signatures. Other conventional methods detect a set of malware-indicative behaviors of the malware agent.

Malicious botnets form a particularly harmful type of malware threat. In one attack scenario, a multitude of computer systems are infected with an agent configured to connect to a remote resource and download a malicious payload or other information such as, for instance, an indicator of a target for launching a denial-of-service attack. The agent may be configured to use a domain generation algorithm (DGA) to generate domain names and to attempt to connect to them. Such domain names are commonly not registered in advance with a domain name registry, and therefore the vast majority of connection attempts fail. When malware creators decide to launch an attack, they register one of these domain names with a domain name registry and place the payload online. Suddenly, attempts by botnet members to connect to the respective domains are successful, and the attack is launched.

Since domain names generation is performed using unknown algorithms, preventing such attacks can be difficult. A security application may see sporadic failed attempts to connect to some domain names, but such attempts are commonly drowned in a multitude of legitimate failed attempts to connect to external sites.

Researchers have a complicated and tedious task in identifying infected agents and reverse-engineering domain generation algorithms. Such algorithms use a variety of methods, one of which is to use the current time as an input to a pseudo-random generation algorithm. In a classical detection approach, researchers must disassemble code in order to determine the DGA and the domain names created.

SUMMARY

According to one aspect, a computer system comprising at least one memory and at least one associated microprocessor is configured to perform, externally from a potential domain generation algorithm (DGA) malware host, the following steps: intercept an original answer to a first external access request, wherein the first external access request is sent by the potential DGA malware host to an external site; parse at least one of the first external access request and the original answer to the first external access request to determine whether the original answer to the first external access request comprises a real time; send a modified answer to the potential DGA malware host, the modified answer being generated from the original answer by replacing an original real time included in the original answer with an accelerated real time subsequent to the original real time; intercept, in response to a second external access request sent by the potential DGA malware host, an answer indicating that the second access request was not successful, wherein the second external access request is sent after the first external access request is sent; and, in response to intercepting the answer indicating that the second access request was not successful, determine that the potential DGA malware host includes malware executing a domain generation algorithm.

According to one aspect, a computer system comprising at least one memory and at least one associated microprocessor is configured to perform, externally from a potential domain generation algorithm (DGA) malware host, the following steps: parse a first external access request to determine whether an original answer to the first external access request comprises an accelerated real time, wherein the first external access request is sent by the potential DGA malware host to an external site; parse a first original answer to the first external access request to determine whether the first original answer comprises a first information indicating that the accelerated real time is not accurate; send a modified answer to the potential DGA malware host, the modified answer being generated from the first original answer by replacing the first information with a second information indicating that the accelerated real time is accurate; intercept, in response to a second external access request sent by the potential DGA malware host to a second external site, a second original answer indicating that the second access request was not successful; and determine, in response to intercepting the second answer, that the potential DGA malware host includes malware executing a domain generation algorithm.

According to another aspect, a non-transitory computer readable medium stores instructions that, when executed, configure at least one memory and at least one associated microprocessor of a first computer system to perform, externally from a potential domain generation algorithm (DGA) malware host, the following steps: intercept an original answer to a first external access request, wherein the first external access request is sent by the potential DGA malware host to an external site; parse at least one of the first external access request and the original answer to the first external access request to determine whether the original answer to the first external access request comprises a real time; send a modified answer to the potential DGA malware host, the modified answer being generated from the original answer by replacing an original real time included in the original answer with an accelerated real time subsequent to the original real time; intercept, in response to a second external access request sent by the potential DGA malware host, an answer indicating that the second access request was not successful, wherein the second external access request is sent after the first external access request is sent; and, in response to intercepting the answer indicating that the second access request was not successful, determine that the potential DGA malware host includes malware executing a domain generation algorithm.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. Unless otherwise specified, a process is an instance of a computer program, such as an application or a part of operating system, and is characterized by having at least an execution thread and a section of virtual memory assigned to it by the operating system, the respective memory section comprising executable code. A blacklist is a list of objects that are blocked from performing a set of actions. Making a determination or decision according to a parameter encompasses making the determination or decision according to the parameter and optionally according to other data. Computer readable media encompass non-transitory media such as magnetic, optic, and semiconductor storage media (e.g. hard drives, optical disks, flash memory, DRAM), as well as communications links such as conductive cables and fiber optic links. A time server is an external server that provides a real time in an answer in response to an access request that the time server receives, and/or provides, in response to an access request including a real time, an answer indicating whether the real time included in the access request is accurate. A time server may or may not be a server that is dedicated to provide real time values. A dedicated time server is dedicated to providing real time values in response to queries. A non-dedicated time server may provide real time values as part of a larger content page which may include other content such as text and images (e.g. a weather server page providing information on the current weather at a particular location in addition to a current real time at that location). According to some embodiments, the present invention provides, inter alia, computer systems comprising hardware (e.g. one or more processors formed on one or more semiconductor substrates) programmed to perform the methods described herein, as well as computer-readable media encoding instructions to perform the methods described herein.

The following description illustrates embodiments of the invention by way of example and not necessarily by way of limitation.

Figure 1:
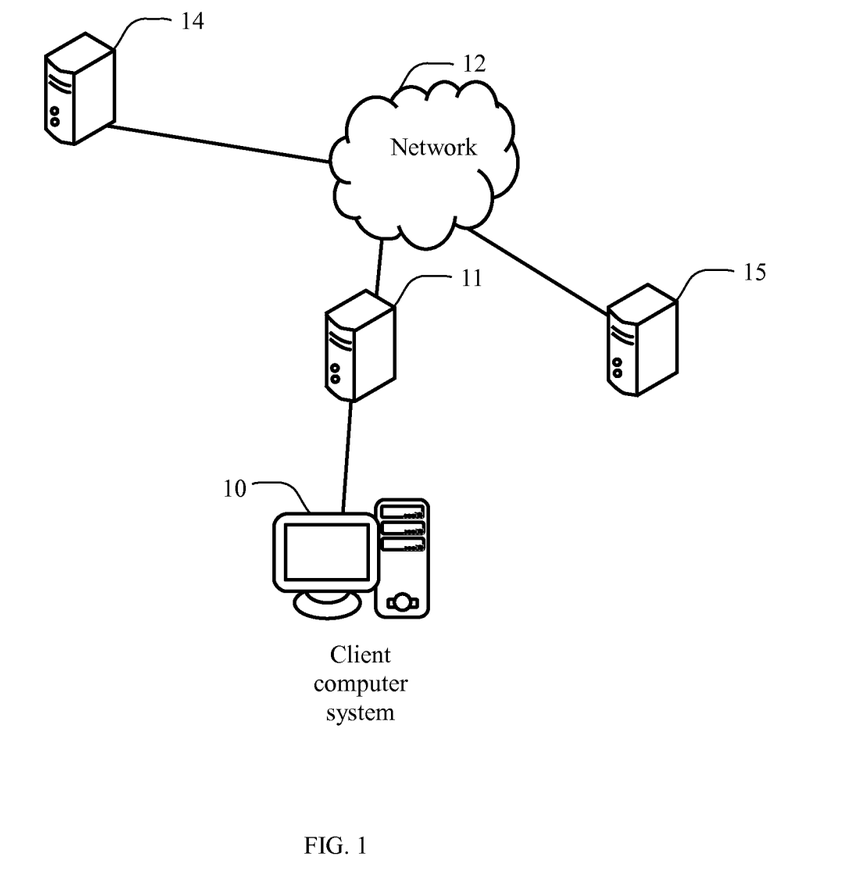
FIG. 1 shows an exemplary client system, a server system hosting an external site, and a time server, all interconnected by a network, according to some embodiments of the present invention.

FIG. 1 shows an exemplary DGA-host client computer system 10 connected to a DGA detection computer system 11, which is further connected to a DGA-target server computer system 14 and a time server computer system 15 through a communication network 12. Client system 10 may be an end-user computer system such as a desktop, laptop, tablet, or smartphone, personal digital assistant (PDA), wearable computing device, household device such as TVs or music player, or other electronic device that can host malware. Client system 10 has at least one hardware processor, memory, and storage, and runs an operating system such as Windows®, MacOS®, Linux, Android®, or iOS®. In some embodiments, client system 10 may be configured to run a hypervisor and one or more virtual machines. Network 12 may be a wide-area network such as the Internet, while parts of network 12 may also include a local area network (LAN).

Some processes executing on client system 10 may be malicious. In particular, some processes may potentially execute DGAs. In some cases, the malware may be hosted by a virtual machine running on client system 10. DGA detection system 11 is tasked with determining whether a process running on the virtual machine executes a DGA. In some embodiments, DGA detection system 11 comprises a computer server through which client system 10 accesses the Internet. In some embodiments, at least part of DGA detection system 11 may be implemented using a router or switch configured with software/hardware implementing at least some DGA detection functions described below. In some embodiments employing virtualization, a DGA detection system as described below may be implemented on client system 10, but outside a virtual machine that forms a potential DGA host running on client system 10. In such virtualization embodiments, a DGA detection system may run on a system hypervisor, and/or on a different virtual machine from the potential DGA host being monitored.

In some embodiments, a security application runs on a server forming at least part of DGA detection system 11. The security application is configured to perform a number of DGA detection steps by analyzing one or more processes running on client system 10. Such an analysis may include analyzing and intercepting external access requests and answers from and to client system 10. In an exemplary embodiment, such a security application is configured to determine whether one or more process running on client system 10 execute a DGA. When DGA malware is detected, the security application further identifies a set of domain names generated by the DGA, and blacklists the set of domain names. The blacklisted domain names may be transmitted as part of software updates to instances of security applications running on multiple client and/or server computers, to facilitate protecting such systems. The identified domain names may also be registered, so as to allow identifying and potentially neutralizing other infected systems.

Client 10 may address an access request to an external site that is hosted by computer system 14. The external site may be characterized by a domain name generated by a domain-generation algorithm. The domain name may be formed by an unintelligible sequence of alphanumeric characters (e.g. adfjhaadew34.com or gsriptoi4534pfh.io). Such a domain name is unlikely to be previously registered with a domain name registrar, and thus is highly likely to be available for registration with a domain name registrar at a future time. If the access request reaches the site hosted by computer system 14, the access request is successful. If for any reason the access request does not reach a site hosted by computer system 14, the access request is unsuccessful. Such a reason may be that such a site does not yet exist, is currently not enabled, or the domain name characterizing the site is not recognized by a domain name system (DNS) as a valid domain, and thus communications addressed to the site are not routed to the site. If the access request is successful, the site hosted by computer system 14 sends back an answer to client system 10. If the access request is not successful, a component of network 12 sends back an answer to client system 10 indicating that the access request was not successful.

Client system 10 also addresses one or more access requests to time server 15. Time server 15 responds to such access requests with a response including a real time. For access requests requesting confirmation of an included real time, time server 15 may also respond with data indicating whether the real time included in the access request is accurate.

Figure 2A:
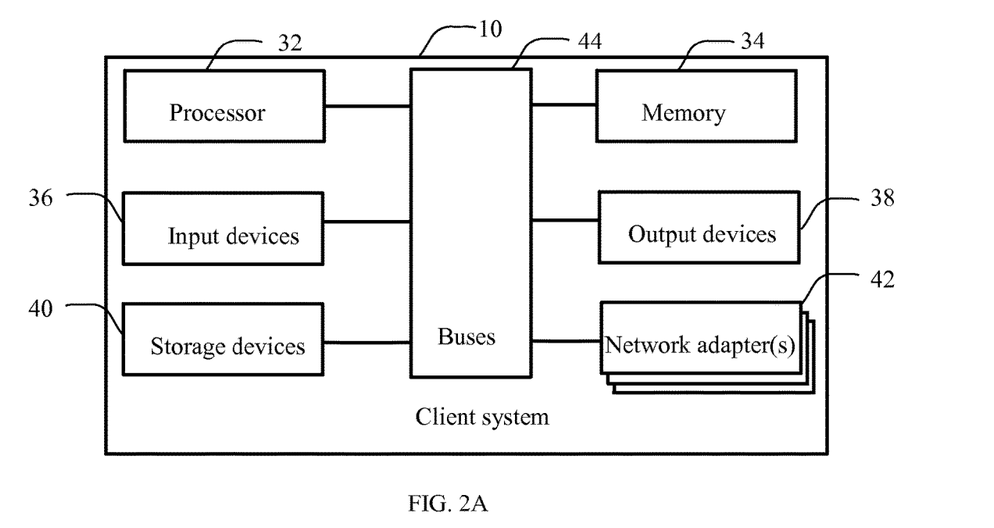
FIG. 2A illustrates an exemplary hardware configuration of a client system that may be a potential DGA malware host, according to some embodiments of the present invention.

FIG. 2-A shows an exemplary hardware configuration of a client system 10 according to some embodiments of the present invention. FIG. 2A shows a particular structure of a computer system for illustrative purposes; other client systems may have a different structure. In some embodiments, system 10 comprises a set of physical devices, including a processor 32, a memory unit 34, a set of input devices 36, a set of output devices 38, a set of storage devices 40, and a set of network adapters 42, all connected by a set of buses 44.

In some embodiments, processor 32 comprises a physical device (e.g. multi-core integrated circuit formed on a semiconductor substrate) configured to execute computational and/or logical operations with a set of signals and/or data. In some embodiments, such logical operations are delivered to processor 32 in the form of a sequence of processor instructions (e.g. machine code or other type of software). Memory unit 34 may comprise non-transitory computer-readable media (e.g. RAM) storing data/signals accessed or generated by processor 32 in the course of carrying out instructions. Input devices 36 may include computer keyboards, mice, and microphones, among others, including the respective hardware interfaces and/or adapters allowing a user to introduce data and/or instructions into client system 10. Output devices 38 may include display screens and speakers among others, as well as hardware interfaces/adapters such as graphic cards, allowing client system 10 to communicate data to a user. In some embodiments, input devices 36 and output devices 38 may share a common piece of hardware, as in the case of touch-screen devices. Storage devices 40 include computer-readable media enabling the non-transitory storage, reading, and writing of software instructions and/or data. Exemplary storage devices 40 include magnetic and optical disks and flash memory devices, as well as removable media such as CD and/or DVD disks and drives. The set of network adapters 42 enables client system 10 to connect to a computer network, e.g., network 12, and/or to other devices/computer systems. Buses 44 collectively represent the plurality of system, peripheral, and chipset buses, and/or all other circuitry enabling the inter-communication of devices 32-42 of client system 10. For example, buses 44 may comprise the northbridge connecting processor 32 to memory 34, and/or the southbridge connecting processor 32 to devices 36-42, among others.

Figure 2B:
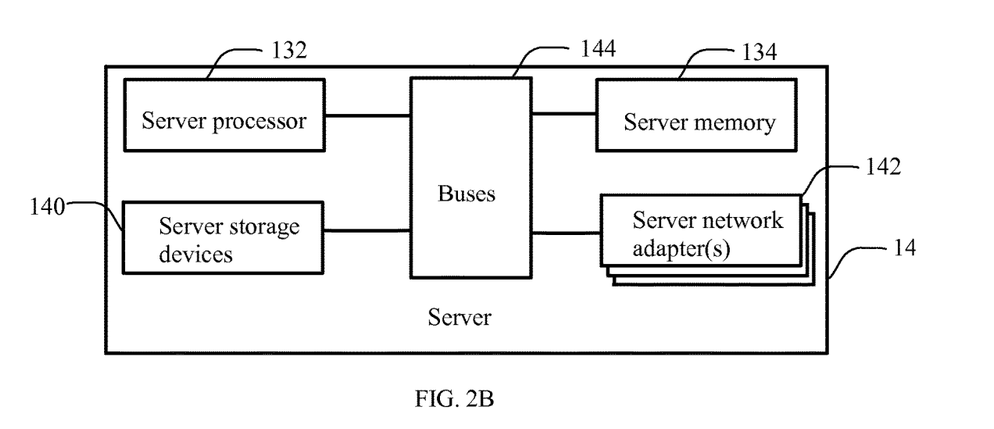
FIG. 2B shows an exemplary hardware configuration of a server computer system or network switch/router that may host a DGA detector, according to some embodiments of the present invention.

FIG. 2-B shows an exemplary hardware configuration of a server, such as a server used to implemented DGA detection system 11 (FIG. 1). Such a server comprises a server processor 132, a server memory 134, a set of server storage devices 140, and a set of network adapters 142, all connected by a set of buses 144. The operation of devices 132, 134, 140, and 142 may mirror that of devices 32, 34, 40, and 42 described above. For instance, server processor 132 may comprise a physical device configured to execute computational and/or logical operations with a set of signals and/or data. Server memory 134 may comprise non-transitory computer-readable media (e.g. RAM) storing data/signals accessed or generated by processor 132 in the course of executing computations. Network adapters 142 enable the server to connect to a computer network such as network 12.

Figure 3A:
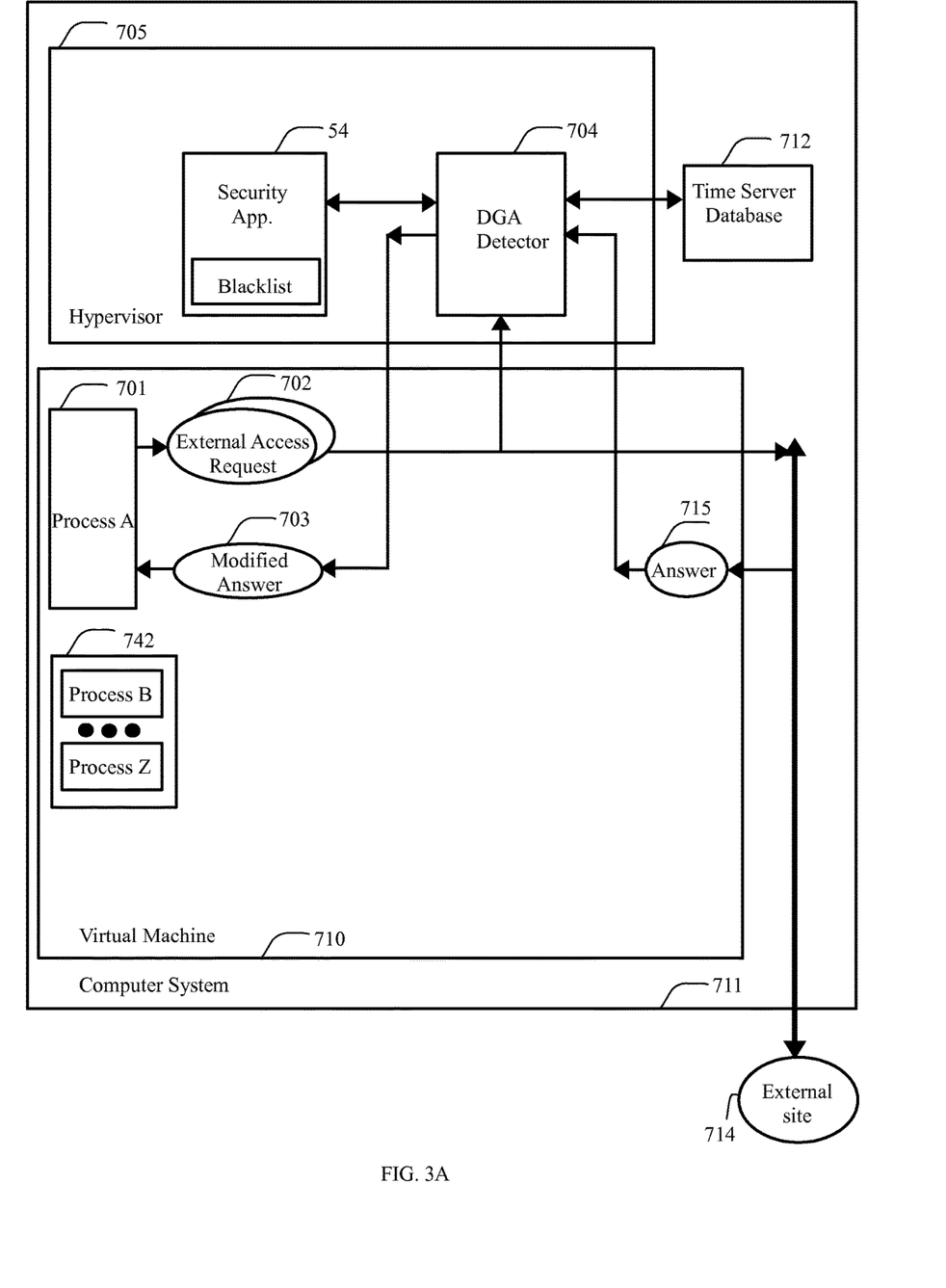
FIG. 3A shows an exemplary set of software objects, including a process running on a potential DGA malware host that is formed by a virtual machine, and a DGA detector hosted by the same physical system as the potential DGA malware host, according to some embodiments of the present invention.

FIG. 3A shows exemplary data exchanges between a potential DGA malware host formed by a virtual machine 710, and a DGA detector 704 external to virtual machine 710. In the illustrated configuration, DGA detector 704 and virtual machine 710 run on a common physical computer system 711. In particular, in the configuration shown in FIG. 3A, DGA detector 704 is an application running on and/or forming part of a hypervisor 705. Virtual machine 710 sends access requests to, and receives answers from, an external site 714. A set of processes 701, 742 run concurrently on virtual machine 710. DGA detector 704 analyzes external access requests 702 sent by an exemplary process 701. DGA detector 704 also intercepts and analyzes original answers 715 to requests 702. Original answers 715 are then modified by DGA detector 704 into modified answers 703. In analyzing requests 702 and original answers 715, DGA detector 704 may query a time server database 712. In FIG. 3A, time series database 712 is shown as hosted on computer system 711. In some embodiments, time server database 712 may be external to computer system 711. Upon a determination that a process executes a DGA, DGA detector 704 instructs a security application 54 to blacklist the process.

Figure 3B:
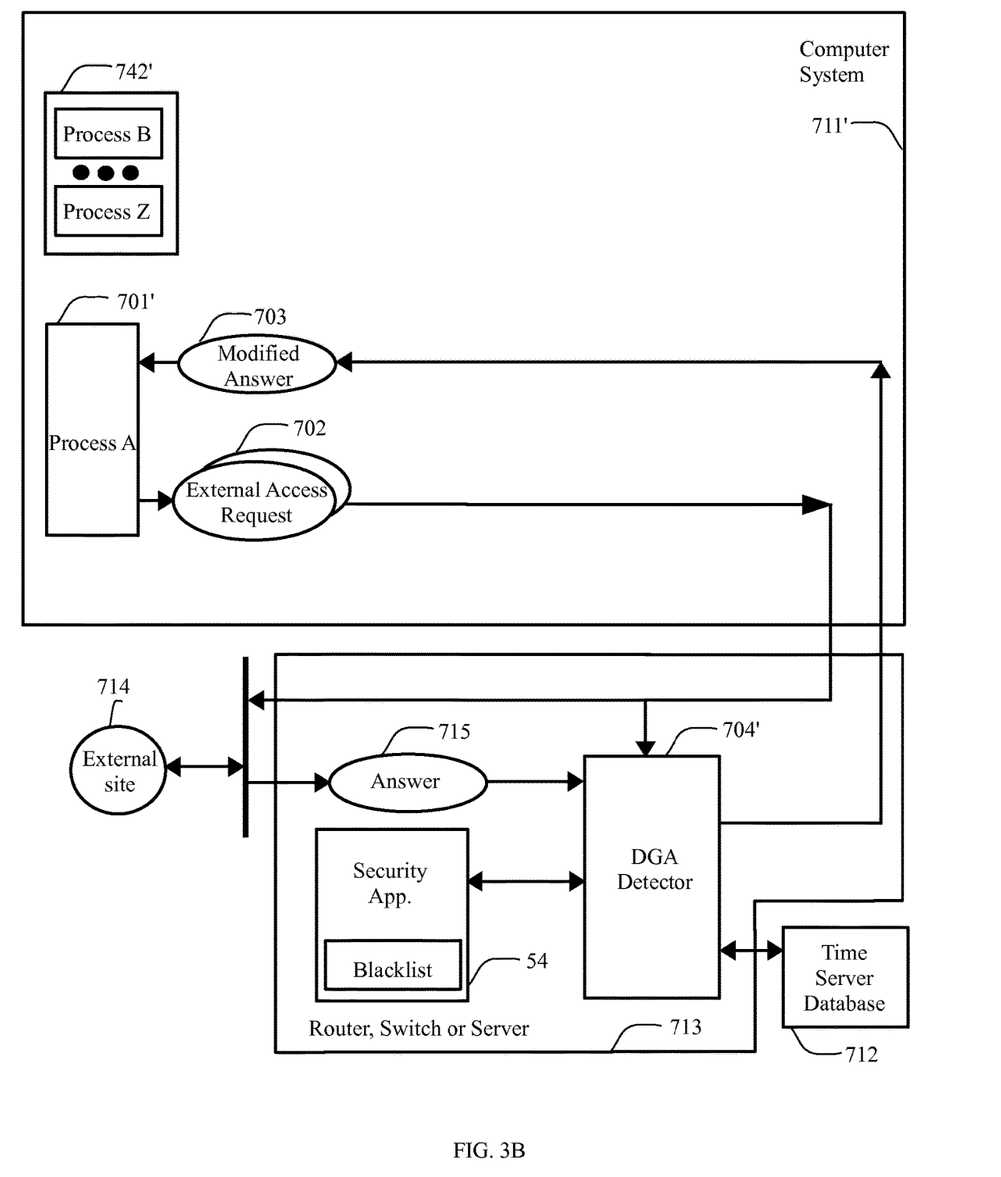
FIG. 3B shows an exemplary set of software objects, including a process running on a potential DGA malware host and a DGA detector hosted on a distinct physical system from the potential malware host, according to some embodiments of the present invention.

FIG. 3B shows exemplary data exchanges between a potential DGA malware host running on a computer system 711', and a DGA detector 704' running on a computer system 713 distinct from system 711', according to some embodiments of the present invention. Computer system 711' may be a client computer system. Computer system 713 may be a router, switch, or server computer. A set of processes 701', 742' run concurrently on computer system 711'. DGA detector 704 analyzes external access requests 702 sent by a process 701 to an external site 714. DGA detector 704 also intercepts and analyzes incoming answers 715 to the requests 702. The original answers 715 may be modified into modified answers 703. In analyzing the requests 702 and the original answers 715, the DGA detector may inquire a time server database 712. Upon a determination that a process executes a DGA, DGA detector 704 determines one or more domain names generated by the DGA, and instructs a security application 54 to add the DGA domains to a blacklist. In some embodiments, security application 54 may also blacklist the DGA-infected process executing on host 711, and generate one or more fingerprints (e.g. hashes) for the identified malware, for transmission to other computer systems.

Figure 4:
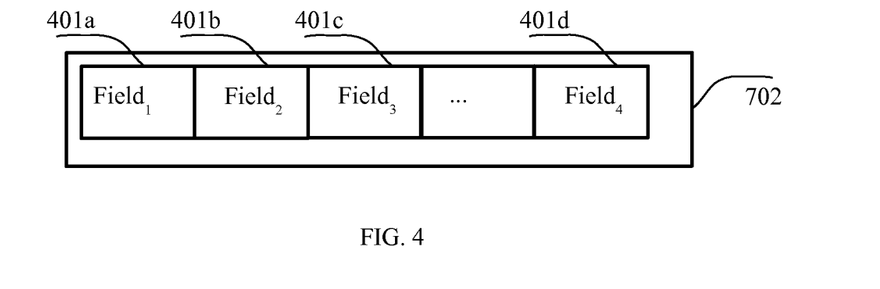
FIG. 4 shows an exemplary external access request and/or an answer, according to some embodiments of the present invention.

FIG. 4 shows an exemplary sequence of fields 401a-d that form part of an external access request 702. An answer, original or modified, to external access request 702 may include a similar sequence of fields. In some embodiments, DGA detector 704 (FIG. 3A) identifies fields that comprise real time information by parsing external access request 702 and/or an answer to external access request 702. Also, DGA detector 704 may also parse external access request 702 to an address of a dedicated or non-dedicated time server. Parsing may be performed using a set of regular expressions, described below, which use formal rules to describe/identify patterns in input data. For example, a date may be identified by searching for a year (e.g. a four-digit number starting with 19 or 20) followed by or preceded by a month and date in any order (e.g. a number from 1 to 12, and a number from 1 to 31, respectively), and separated by one of several defined separators (e.g. space, comma, etc.). As another example, a real time may identified by two or three numbers, constrained to be up to 24, 60, and 60, respectively, and separated by one of several defined separators (e.g. space, etc.). A time server address may be identified by the presence of one of several prefixes (e.g. a protocol identifier such as http, https, ftp, or network time protocol, ntp) and a domain name or Internet Protocol (IP) address present in a database or other list of domain name servers.

The syntax and particular design of suitable regular expressions may depend on the particular software language and standard libraries chosen for implementing a parsing engine of DGA detector 704. The IEEE POSIX standard provides a suitable syntax for regular expressions. In addition, standard libraries for handling regular expressions are available in a variety of languages, including Perl, Java, Python, C++, and others.

Consider for example a set of regular expressions employing the following syntax, which is used by the IEEE POSIX standard:

( )=defines a group
[0-9]=any number character between 0 and 9
[a-z]=any letter character between a and z
{n}=previous group may be repeated exactly n times, wherein n is a natural number
{,n}=previous group may be repeated no more than n times, wherein n is a natural number
{n,}=previous group may be repeated at least n times, wherein n is a natural number
{m, n}=previous group may be repeated between m times and n times, wherein m and n are natural numbers
{m, n, p}=previous group may be repeated m, n, or p times, wherein m, n, and p are natural numbers
$=end of the text to be analyzed With the syntax above, the regular expression "^(19|20)\d\d[-/.](0[1-9]|1[012])[-/.](0[1-9]|[12][0-9]|3[01])$" matches a date in a yyyy-mm-dd format from between 1900-01-01 and 2099-12-31, with a choice of four separators. The four separators are "-", " ", "/", and ".". Also as an example, the regular expression "^(ht|f)tp(s?)\: V V V[0-9a-zA-Z]([-.\w]*[0-9a-zA-Z])*(:(0-9)*)*( V ?)([a-zA-Z0-9\-\.\?\,\' V \\\+&%\$#_]*)?$" matches the address of an URL website address.

Figure 5A:
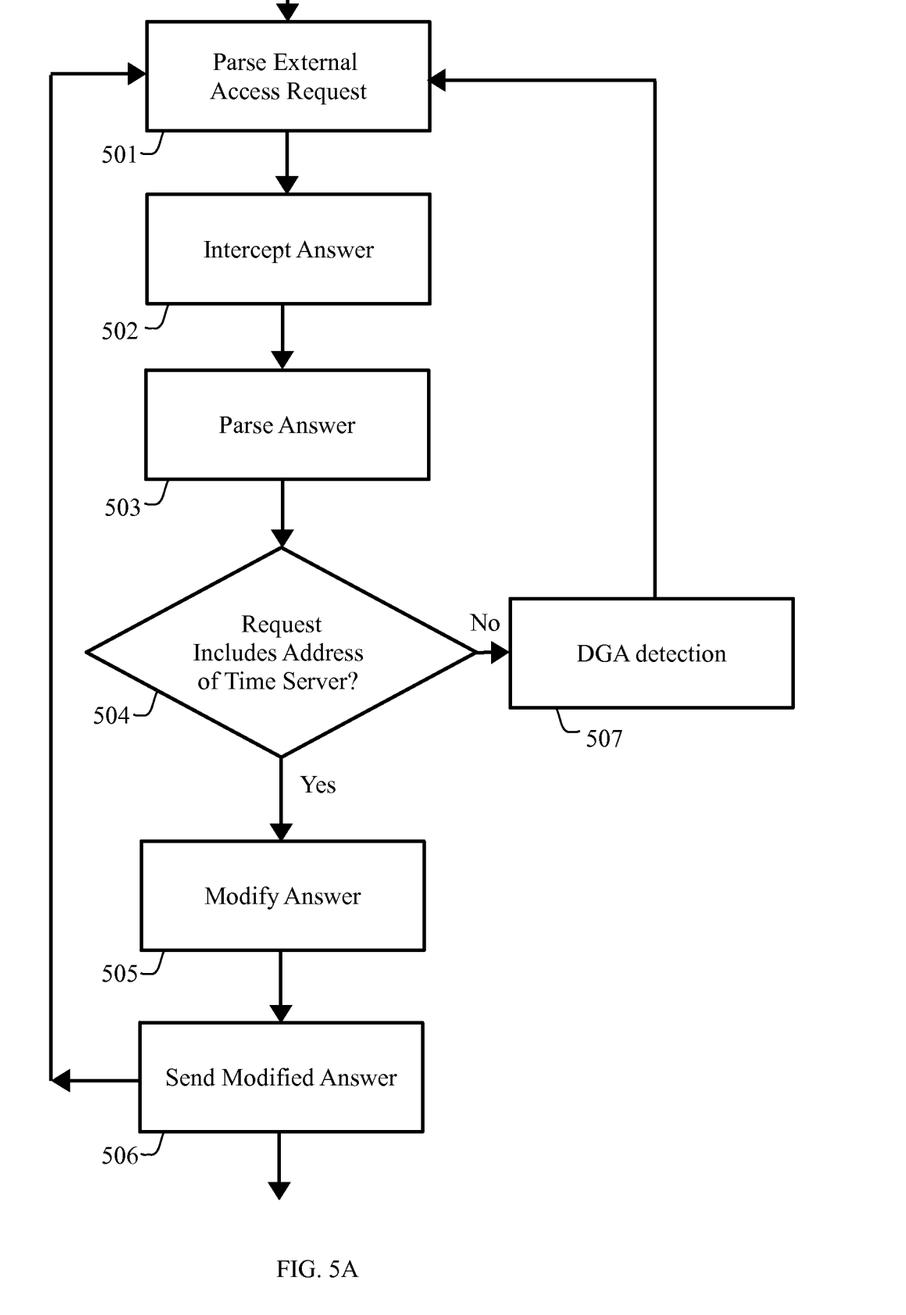
FIG. 5A shows an exemplary sequence of steps executed by a DGA detector when parsing an external access request to a time server, according to some embodiments of the present invention.

FIG. 5A shows an exemplary sequence of steps carried out by DGA detector 704 (FIGS. 3A-B) to parse an external access request to a time server, according to some embodiments of the present invention. In a step 501, DGA detector 704 parses all external access requests. DGA detector 704 further intercepts an original answer to an external access request (step 502) and parses the original answer (step 503). In a step 504, DGA detector 704 determines whether the expected answer comprises a real time. As noted above, the illustrated steps need not be performed in the particular order shown; for example, in some embodiments step 504 may be performed before steps 502 and/or 503. The determination in step 504 may be made by determining if the access request includes an address of a dedicated or non-dedicated time server, by comparing the address targeted by the access request to one or more lists of time servers including dedicated and non-dedicated time servers. Dedicated time servers may be identified via pre-defined lists such as those made available by the Network Time Foundation at its Network Time Protocol site, www.ntp.org. Dedicated time server may also be identified via the presence of a network time protocol (ntp) identifier in the request. Non-dedicated time servers may be identified by searching general-interest sites (e.g. www.yahoo.com) and special-purpose sites (e.g. www.weather.com) to select sites that return a real time, and generating a list of non-dedicated time servers according to the search results. In step 504, DGA detector 704 may query a time server database 712 to determine if a match exists between a URL address found by parsing and a list of URL addresses from the time server databases 712.

If DGA detector 704 determines that the external access request does not include the address of a time server, DGA detector 704 detects in a step 507 whether the process executes a DGA. Step 507 is described in detail below. If DGA detector 704 determines that the external access request does include the address of a time server, DGA 704 detector modifies (step 505) the intercepted original answer by replacing an original real time with an accelerated real time, as explained below. Then DGA detector 704 sends (step 506) the modified answer to the process that sent the access request parsed in step 501.

Figure 5B:
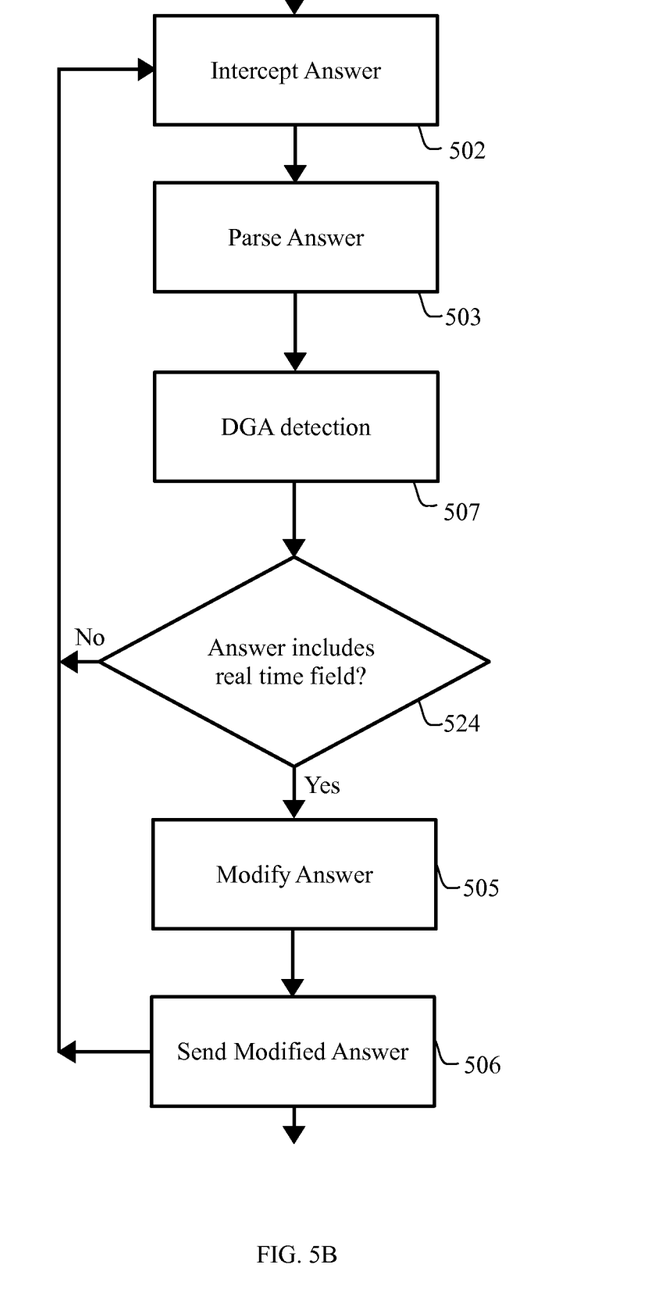
FIG. 5B shows an exemplary sequence of steps executed by a DGA detector when intercepting an original answer to an external access request, according to some embodiments of the present invention.

FIG. 5B shows an exemplary sequence of steps carried out by DGA detector 704 (FIGS. 3A-B) to parse an original answer to an external access request, according to some embodiments of the present invention. In step 502, DGA detector 704 intercepts an original answer to an external access request. In step 503, DGA detector 704 parses the original answer as described above. DGA detector 704 determines whether the process executes a DGA in a step 507.

DGA detector 704 further determines whether the original answer includes a real time field in a step 524. The determination performed in step 524 may include searching for one or more real time values embedded in text fields and/or image fields. Searching text and/or image fields may be accomplished using methods known in the art. In some embodiments, searching for a text field may include editing an object containing the field using a specialized application (e.g., a text editor for a text file). Step 524 may include matching a regular expression for date against a result from the parsing. Then DGA detector 704 modifies (step 505) the intercepted answer by replacing the real time with an accelerated real time, as explained below. Then DGA detector 704 sends (step 506) the modified answer to the process that sent the access request that was parsed.

Figure 5C:
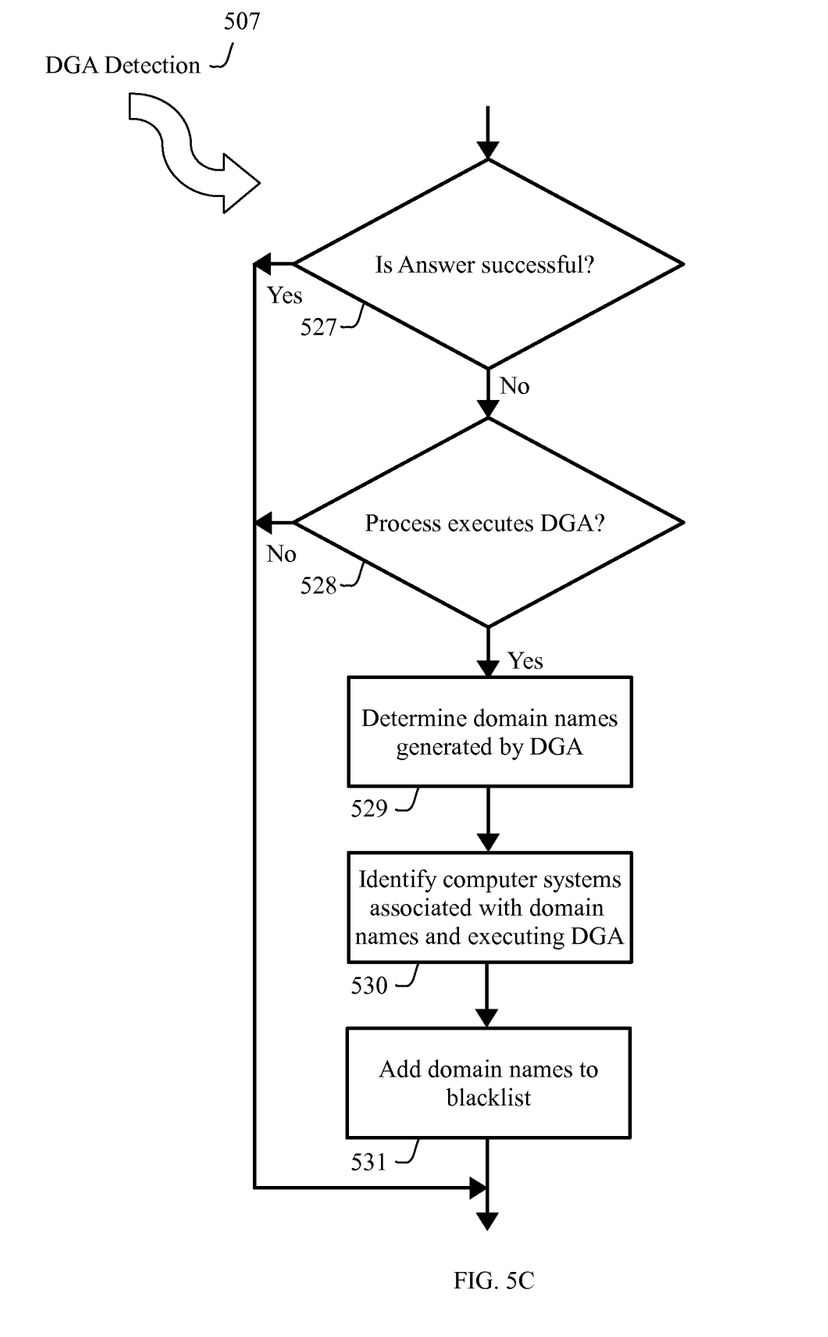
FIG. 5C shows an exemplary sequence of steps executed by a DGA detector when detecting if a process executes DGAs, according to some embodiments of the present invention.

FIG. 5C shows an exemplary sequence of steps within step 507 (FIGS. 5A-B) carried out by DGA detector 704 (FIGS. 3A-B) when determining whether a process executes a DGA. In a step 527, DGA detector 704 determines if an original answer to the access request is successful. If the original answer is not successful, DGA detector 704 determines (step 528) if a process running on the computer system executes a DGA. The determination in step 528 may be performed using methods known in the art. Details about the DGA detection from step 528 are presented below. If the process executes the DGA, domain names generated by the DGA are determined (step 529). The domain names identified in step 529 are added to a blacklist from a security application in a step 531. The blacklist may be used to timely update a plurality of client systems 10, which may become protected against the DGA malware. The security application may further be configured to register the domain names from step 509 into a designated registrar's database of domain names. A timely registration of the domain names may prevent malware creators from using the domain names to propagate and/or to activate botnet malware. The security application may further be configured to identify a set of computer systems that send access requests to the registered domain names. The identified set of computer systems may include botnet members. An early identification of may limit the propagation of botnet malware.

Malware may determine a real time through a variety of methods, for example by querying the operating system running on the computer system. A security application may change the real time that the operating system indicates, by indicating an accelerated real time. An accelerated real time indicates a real time in the future. Malware may request a value of the real time by querying the OS. On a computer system running Windows®, a call to a function GetSystemTime( ) may be used to retrieve the value of the real time. Malware may then verify that the accelerated real time indicated by the OS is accurate. To verify, malware may include the accelerated real time in an external access request to a time server. An original answer from the time server may include an indication whether the accelerated real time is accurate.

Figure 5D:
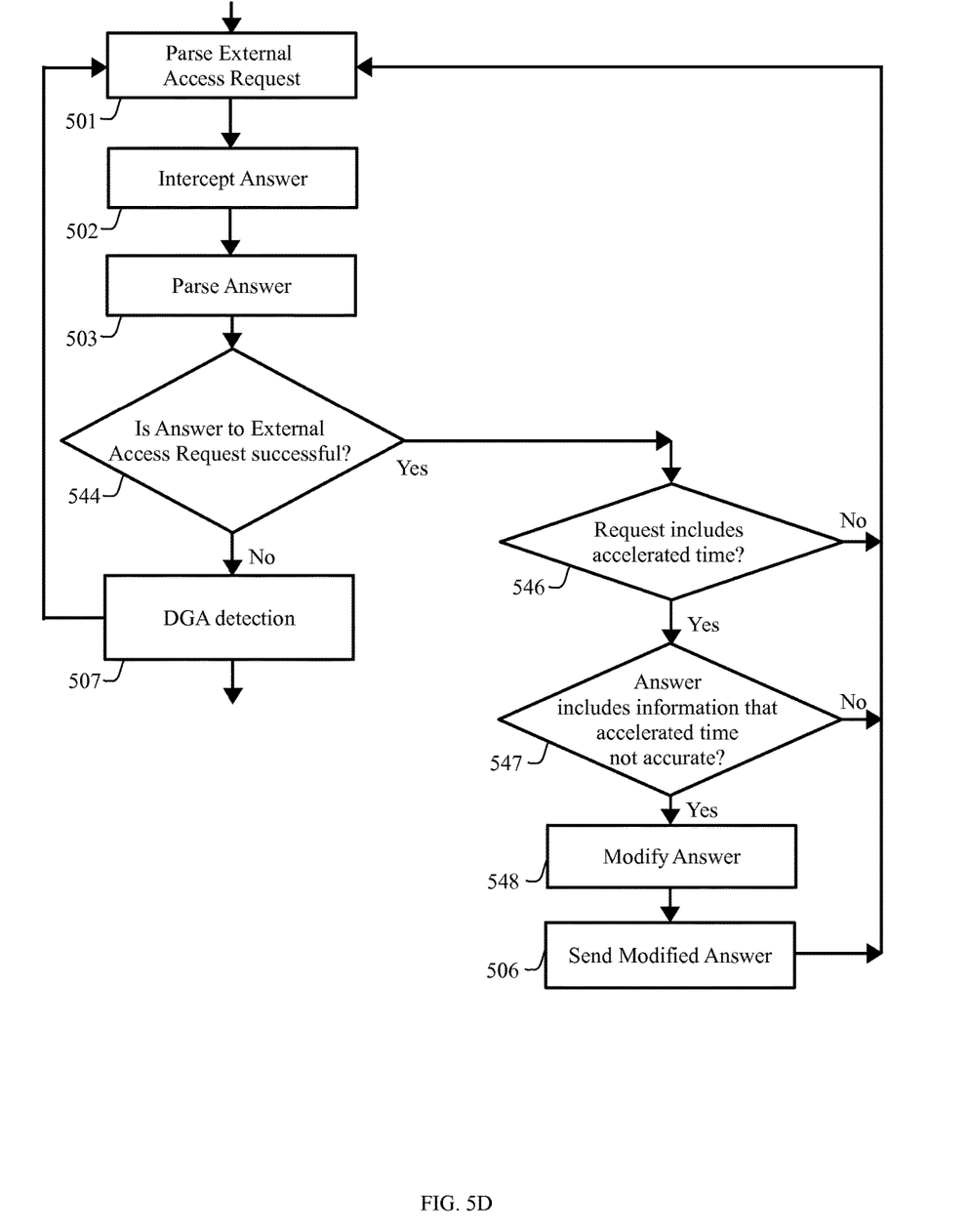
FIG. 5D shows an exemplary sequence of steps executed by a DGA detector when parsing an external access request that includes an accelerated real time, according to some embodiments of the present invention.

FIG. 5D shows an exemplary sequence of steps carried out by DGA detector 704 (FIGS. 3A-B) to parse an external access request that includes an accelerated real time, according to some embodiments of the present invention. In step 501, DGA detector 704 parses all external access requests. Next, DGA detector 704 intercepts an original answer to the external access request (step 502) and parses the original answer (step 503). In a step 544, DGA detector 704 determines whether the original answer is successful. If the original answer is successful, DGA detector 704 then determines whether the request includes an accelerated real time (step 546). Such a determination may be made by comparing a time extracted from the parsed request with a value of the current time. The comparison may be performed with a desired level of precision—for example by determining whether the date and/or hour (but not necessarily minutes/seconds) match. DGA detector 704 may determine the value of the current time by querying the operating system running on the computer system. If such an accelerated real time is included, DGA detector 704 determines whether the original answer includes an original information that the accelerated real time is not accurate (step 547). If the original answer includes an original information that the accelerated real time is not accurate, DGA detector 704 modifies (step 548) the original answer by replacing the original information with a modified information indicating that the accelerated real time is accurate. Then DGA detector 704 sends (step 506) the modified answer to the process that sent the access request that was parsed. If the original answer is not successful, DGA detector carries out the DGA detection step 507 described above.

In a step 545 an original answer to the parsed request is intercepted (step 545) and parsed (step 546). In a step 547 DGA detector 704 determines if the parsed original answer includes an information that the accelerated real time determined in step 543 is not accurate. If a positive determination is made in the step 547, DGA detector 704 replaces the information that the accelerated real time is inaccurate with an information that the accelerated real time is accurate and generates a modified answer. The modified answer is then sent to the process that sent the parsed access request.

Figure 6:
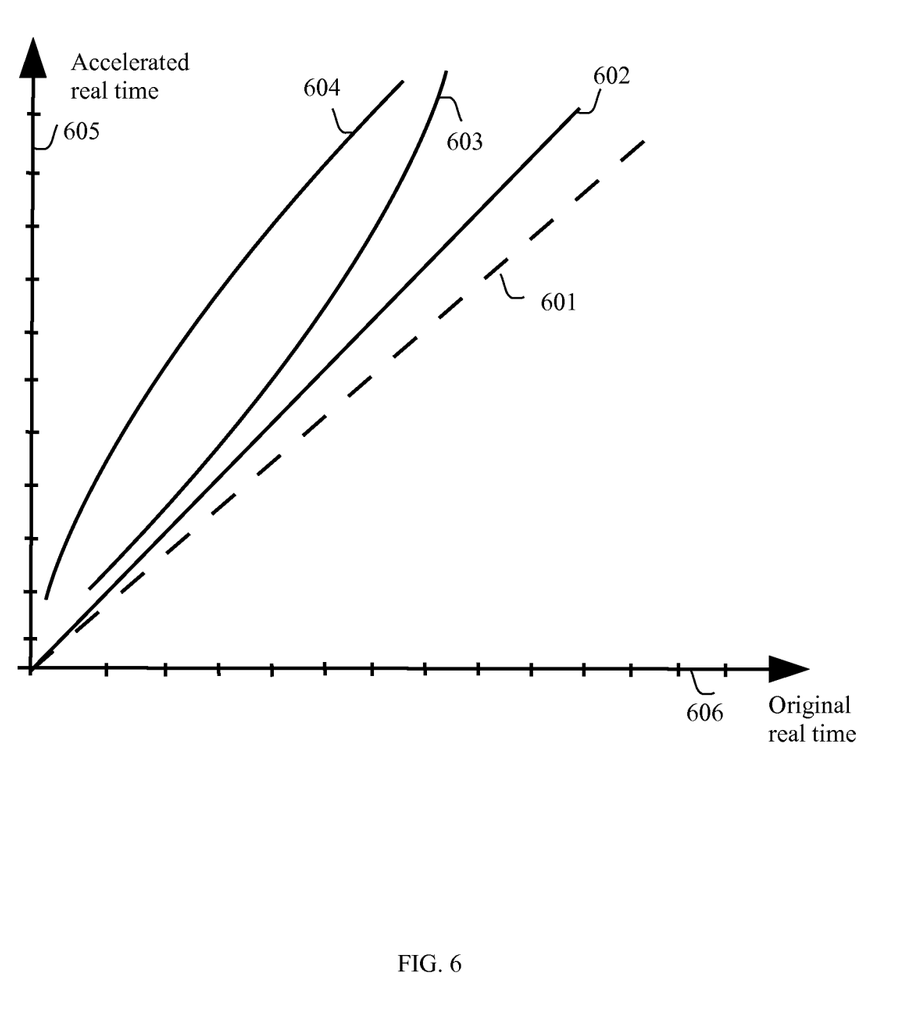
FIG. 6 shows a plurality of mathematical relationships between an original real time and an accelerated real time according to some embodiments of the present invention.

FIG. 6 shows a mathematical relationship between an original real time 606 and an accelerated real time 605, when successive answers include original real times. This mathematical relationship may be encoded in the DGA detector by a function that may be independent upon the process issuing the external access request. In one embodiment, the real time may be the current time that is measured on the client system by the OS. Dashed line 601 shows the case where the accelerated real time is equal to the original real time. In one embodiment, the accelerated real time may be represented by a convex function 603. This may be desirable when it is advantageous to provide an accelerated real time that permanently runs faster than the real time, for example when a process is verified against a certain behavior. In one embodiment, the accelerated real time may be represented by a concave function 604. This may be desirable when it is advantageous to provide an accelerated real time that, after a duration in which it ran considerably faster than the original real time, is slowed down, for example when the behavior of a process is verified in detail over a duration of time. In one embodiment, the accelerated real time may be represented by a straight line function 602. This may be desirable when the behavior of a process is studied for the first time, without any prior knowledge.

Various methods may be used to determine whether a process executes a DGA. Some methods may analyze the URL of external site 714 (FIG. 1), and use heuristics such as the observation that many URLs generated by DGAs do not start with 'www.' Other methods may apply heuristics to analyze the intelligibility of the URL accessed. Yet other methods rely on greylisting any external site that was registered with a domain registrar within a predetermined latest period, e.g. in the last 24 hours.

Figure 7:
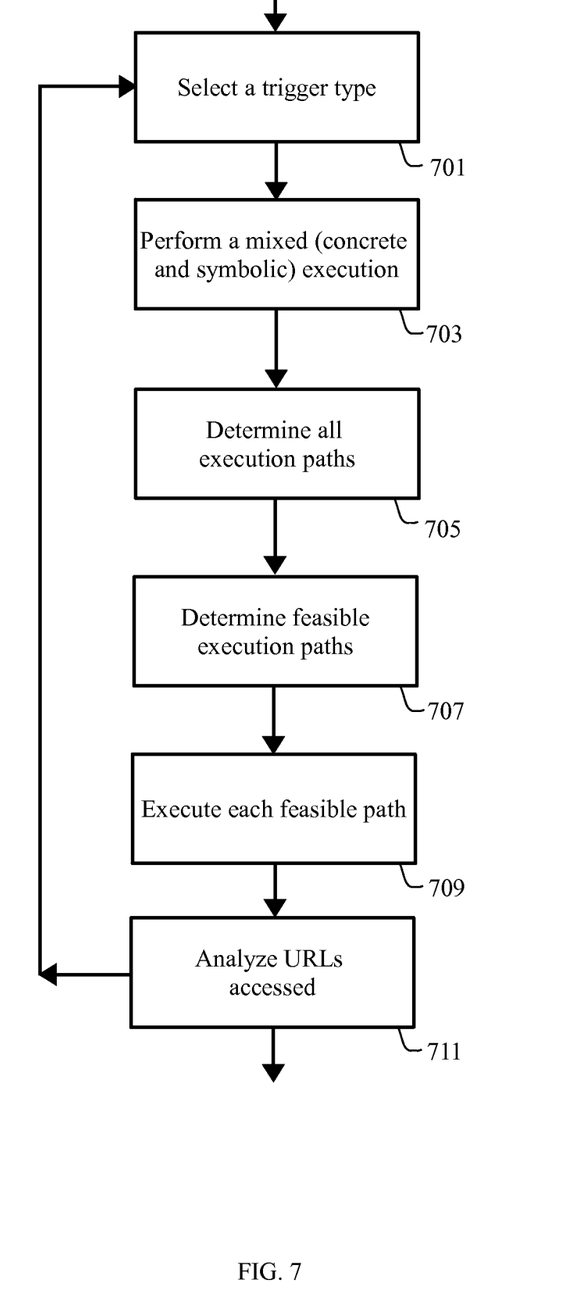
FIG. 7 shows a sequence of steps of a method that can be used to determine whether a suspicious process executes DGA, according to some embodiments of the present invention.

More elaborate methods for DGA detection may employ an analysis of the executable code of a suspected process. FIG. 7 shows such a method. Such a method relies on the observation that at least some DGA malware is triggered by events that are of certain known types (such as time, system events, etc.) In a first step 701, a trigger type is selected for analysis. In a step 703 the suspected process is executed using a mixed (concrete and symbolic) execution, while feeding the suspected process inputs of the selected trigger type. The inputs of the selected trigger types are represented as symbolic variables. Each step in the mixed execution is executed concretely if no branching depending on a symbolic variable occurs in that step, and is executed symbolically otherwise. In a step 705 all execution paths are determined, based on the values of the symbolic variables. In a step 707 all feasible execution paths are determined. Some of the execution paths determined in step 705 may not be feasible, for example because they require two trigger values that are inconsistent with respect to each other. For example, an execution path that is not feasible may include two branches, the first branch being triggered if a real time value is anterior to May 2015, and the second branch being triggered if the real time value is posterior to July. 2015. Finally, in a step 711 URLs generated in each feasible path are analyzed. The analysis may include correlating URLs with certain trigger types and values. As an example, if more than 80% of the URLs are generated in response to a change in the value of no more than two trigger types, then a determination that the suspected process executes DGA is made.

The exemplary systems and methods described above allow detecting malware such as DGA-execution botnets. In some embodiments, a suspicious process runs on a machine separate from the machine that intercepts and parses external access requests and answers, and detects DGA. The separate machine may be a different physical computer system, or a virtual machine hosted on the same physical computer system. All answers are parsed and the answers including an original real time are modified. Within the modified answers the accelerated real time replaces the original real time. The suspicious process is then analyzed to determine if it executes a DGA. By providing an accelerated real time, the domain names generated by the DGA may be obtained before the actual time when they would be generated.

In some embodiments, the suspicious process may send an external access request that includes an accelerated real time. This situation may occur when the suspicious process attempts to verify a real time obtained from querying the operating system. Researchers may alter the real time indicated by the operating system, by pointing to a time in the future. Thus, the real time indicated by the operating system becomes an accelerated real time. In normal operation, an original answer from the external site indicates that the accelerated real time is not accurate. The original answer is modified such that the modified answer indicates that the accelerated real time is accurate. The suspicious process is then analyzed to determine if it executes a DGA. By providing an accelerated real time, the domain names generated by the DGA may be obtained before the actual time when they would be generated. Researchers may thus determine the domain names that the DGA will generate in the future.

When multiple answers sent by the suspicious process and that include real time are received, several mathematical functions may be used in order to compute the accelerated real time for the modified answers, according to some embodiments. These various functions are desirable when a certain frequency in the generation of the domains by the DGA is suspected.

Providing an accelerated real time and therefore triggering the DGA execution allows researchers to detect malicious behavior without engaging in time-consuming efforts to reverse engineer executable code. Blacklisting domains that are generated by DGAs allow security applications vendors to provide updates to their customers before malware using domain generation algorithms is activated by the malware creators. The domains that are determined to be generated by DGAs may be registered in advance, and botnet members may be identified according to the requests received at the registered domains.

Intercepting, parsing, and detecting the DGA execution externally from the potential DGA malware host provides the advantage of insulating the potential DGA malware host from the researching tools. Therefore, the risk that the malware modifies its behavior in the presence of anti-malware tools is greatly reduced. In addition, such an approach does not require changing in the internal real time indicated by the OS of the DGA malware host. Researchers may choose the optimum computing environment to detect DGA malware. In some embodiments, it may be desirable to launch the suspicious process. In some embodiments, it may be desirable to detect DGA malware from a router or switch that aggregates the Internet traffic of an Intranet network.

It will be clear to one skilled in the art that the above embodiments may be altered in many ways without departing from the scope of the invention. Accordingly, the scope of the invention should be determined by the following claims and their legal equivalents.

What we claim is:

1. A first computer system comprising at least one memory and at least one associated microprocessor configured to perform, externally from a potential domain generation algorithm (DGA) malware host, the following steps:
   intercept an original answer to a first external access request, wherein the first external access request is sent by the potential DGA malware host to an external site;
   parse at least one of the first external access request and the original answer to the first external access request to determine whether the original answer to the first external access request comprises a real time indicating a present time of the original answer;
   send a modified answer to the potential DGA malware host, the modified answer being generated from the original answer by replacing the real time included in the original answer with an accelerated real time subsequent to the original real time;
   intercept, in response to a second external access request sent by the potential DGA malware host, an answer indicating that the second access request was not successful, wherein the second external access request is sent after the first external access request is sent; and
   in response to intercepting the answer indicating that the second access request was not successful, determine that the potential DGA malware host includes malware executing a domain generation algorithm.

2. The first computer system of claim 1, wherein parsing at least one of the first external access request and the original answer to the first external access request comprises identifying an address of a time server in an address field of the first external access request.

3. The first computer system of claim 1, wherein parsing at least one of the first external access request and the original answer to the first external access request comprises parsing the original answer to the first external access request to identify a real time field from a plurality of fields of the original answer to the first external access request.

4. The first computer system of claim 3, wherein identifying the real time field comprises comparing a content of the real time field to an independent real time value determined by the first computer system.

5. The first computer system of claim 1, wherein the potential DGA malware host is a second computer system physically distinct from the first computer system.

6. The first computer system of claim 1, wherein the potential DGA malware host is a virtual machine hosted by the first computer system.

7. The first computer system of claim 1, wherein the at least one associated microprocessor is further configured to determine a domain name generated by the domain generation algorithm and identify, according to the domain name, a plurality of computer systems suspected of executing the domain generation algorithm.

8. The first computer system of claim 1, wherein the at least one associated microprocessor is further configured, in response to determining that the potential DGA malware host includes malware executing the domain generation algorithm, to add a domain name generated by the domain generation algorithm to a security application blacklist.

9. A first computer system comprising at least one memory and at least one associated microprocessor configured to perform, externally from a potential domain generation algorithm (DGA) malware host, the following steps:
  parse a first external access request to determine whether the first external access request comprises a real time indicating a present time of the first external access request, wherein the first external access request is sent by the potential DGA malware host to an external site;
  parse a first original answer to the first external access request to determine whether the first original answer comprises a first information indicating that the real time is not accurate;
  send a modified answer to the potential DGA malware host, the modified answer being generated from the first original answer by replacing the first information with a second information indicating that the real time is accurate;
  intercept, in response to a second external access request sent by the potential DGA malware host to a second external site, a second original answer indicating that the second access request was not successful; and
  determine, in response to intercepting the second answer, that the potential DGA malware host includes malware executing a domain generation algorithm.

10. A non-transitory computer readable medium storing instructions that, when executed, configure at least one memory and at least one associated microprocessor of a first computer system to perform, externally from a potential domain generation algorithm (DGA) malware host, the following steps:
  intercept an original answer to a first external access request, wherein the first external access request is sent by the potential DGA malware host to an external site;
  parse at least one of the first external access request and the original answer to the first external access request to determine whether the original answer to the first external access request comprises a real time indicating a present time of the original answer;
  send a modified answer to the potential DGA malware host, the modified answer being generated from the original answer by replacing the real time included in the original answer with an accelerated real time subsequent to the original real time;
  intercept, in response to a second external access request sent by the potential DGA malware host, an answer indicating that the second access request was not successful, wherein the second external access request is sent after the first external access request is sent; and
  in response to intercepting the answer indicating that the second access request was not successful, determine that the potential DGA malware host includes malware executing a domain generation algorithm.

11. The non-transitory computer readable medium of claim 10, wherein parsing at least one of the first external access request and the original answer to the first external access request comprises identifying an address of a time server in an address field of the first external access request.

12. The non-transitory computer readable medium of claim 10, wherein parsing at least one of the first external access request and the original answer to the first external access request comprises parsing the original answer to the first external access request to identify a real time field from a plurality of fields of the original answer to the first external access request.

13. The non-transitory computer readable medium of claim 12, wherein identifying the real time field comprises comparing a content of the real time field to an independent real time value determined by the first computer system.

14. The non-transitory computer readable medium of claim 10, wherein the potential DGA malware host is a second computer system physically distinct from the first computer system.

15. The non-transitory computer readable medium of claim 10, wherein the potential DGA malware host is a virtual machine hosted by the first computer system.

16. The non-transitory computer readable medium of claim 10, wherein the at least one associated microprocessor is further configured to determine a domain name generated by the domain generation algorithm and identify, according to the domain name, a plurality of computer systems suspected of executing the domain generation algorithm.

17. The non-transitory computer readable medium of claim 10, wherein the at least one associated microprocessor is further configured, in response to determining that the potential DGA malware host includes malware executing the domain generation algorithm, to add a domain name generated by the domain generation algorithm to a security application blacklist.

* * * * *